Oct. 28, 1969  L. SCHNELL  3,474,549
APPARATUS FOR CONVEYING SAND OR THE LIKE
Filed Sept. 2, 1967  2 Sheets-Sheet 1

Inventor:
Ludwig Schnell
by Michael J. Striker
Atty

Oct. 28, 1969 L. SCHNELL 3,474,549
APPARATUS FOR CONVEYING SAND OR THE LIKE
Filed Sept. 6, 1967 2 Sheets-Sheet 2

Inventor:

United States Patent Office 3,474,549
Patented Oct. 28, 1969

3,474,549
APPARATUS FOR CONVEYING SAND OR THE LIKE
Ludwig Schnell, 86 Hauptstrasse, 7081 Aufhausen, Wurttemberg, Germany
Filed Sept. 6, 1967, Ser. No. 665,805
Claims priority, application Germany, Sept. 9, 1966, Sch 39,513
Int. Cl. E02f *3/92;* B65g *53/30;* F04f *5/24*
U.S. Cl. 37—61
12 Claims

ABSTRACT OF THE DISCLOSURE

Apparatus for pumping silt, sand, gravel or other comminuted material from river beds or the like comprises a suction head whose inlet defines with a rotary nozzle an upwardly converging annular orifice for admission of a pressure medium which creates suction at the inlet to draw comminuted material into the suction head. The nozzle is detachably mounted on a tubular carrier surrounding a tubular pressure head which in turn surrounds the suction head and defines therewith an annular passage for admission of pressure medium into the nozzle. A set of helically distributed blades provided on the carrier and on the nozzle rotates about the inlet of the suction head to urge the nozzle into a supply of comminuted material when the carrier is driven by an electric motor mounted on the pressure head.

BACKGROUND OF THE INVENTION

The present invention relates to apparatus for conveying comminuted materials, particularly for pumping sand, silt, gravel or the like from the beds of rivers, from the bottoms of lakes, ponds or other bodies of water.

Presently known pumping apparatus normally comprise a suction head which draws comminuted material to a level above the water surface and a rotary tool having several knives whose purpose is to promote penetration of the suction head into comminuted material. Such tool is installed at one side of the suction head so that the latter tends to tilt and its material evacuating action is often very unsatisfactory.

SUMMARY OF THE INVENTION

It is an object of my invention to provide a conveying apparatus for sand or like materials which overcomes the drawbacks of conventional apparatus and wherein the material removing or lifting action of the suction head is enhanced in a novel and improved way.

Another object of the invention is to provide the conveying apparatus with a novel impeller assembly which facilitates continuous evacuation of comminuted material through the suction head.

A further object of the invention is to provide an impeller assembly which promotes the progress and the material removing action of the suction head.

An additional object of the invention is to provide a novel device for generating suction at the inlet of the suction head in an apparatus for pumping sand, silt, gravel or like materials from the beds of rivers, from the bottoms of lakes or from other accumulations of comminuted material.

A concomitant object of the invention is to provide the conveying apparatus with a novel propelling or digging device which causes controlled penetration of the suction head into a body of comminuted material.

Briefly outlined, the invention is embodied in an apparatus for conveying comminuted materials, particularly for pumping sand or the like from a supply of such material below a body of water. The apparatus comprises a tubular suction head having a material-admitting inlet at one end and another end connectable with an evacuating pipe or the like, and impeller means for promoting the inflow of material into the suction head when the inlet is placed adjacent to a supply of material. The impeller means comprises a portion which is substantially or exactly concentric with the inlet of the suction head and may be constituted by a nozzle which defines with the inlet an annular orifice to admit into the suction head a stream of compressed air or other suitable pressure medium which creates suction in the inlet to cause inflow of material into the suction head whereby the material enters the stream of pressure medium and is entrained into the evacuating pipe. The nozzle is preferably provided with one or more blades and is rotated by a drive carried by the suction head to dig itself into a supply of material and to thereby loosen the material prior to entry into the suction head. The pressure medium is preferably admitted by a tubular pressure head which surrounds the suction head and defines therewith an annular passage in communication with the aforementioned orifice. The nozzle is preferably detachable from one end of a tubular carrier which is rotatable on the pressure head and is driven by an electric motor through the intermediary of a gear train or another suitable transmission. Additional blades can be provided on the tubular carrier, and the blades of the carrier and/or nozzle can be arranged in one or more helical formations to enhance the penetration of nozzle into a supply of sand or the like.

The novel features which are considered as characteristic of the invention are set forth in particular in the appended claims. The improved conveying apparatus itself, however, both as to its construction and its mode of operation, together with additional features and advantages thereof, will be best understood upon perusal of the following detailed description of a specific embodiment with reference to the accompanying drawing.

DESCRIPTION OF THE PREFERRED EMBODIMENT

Figure 1:
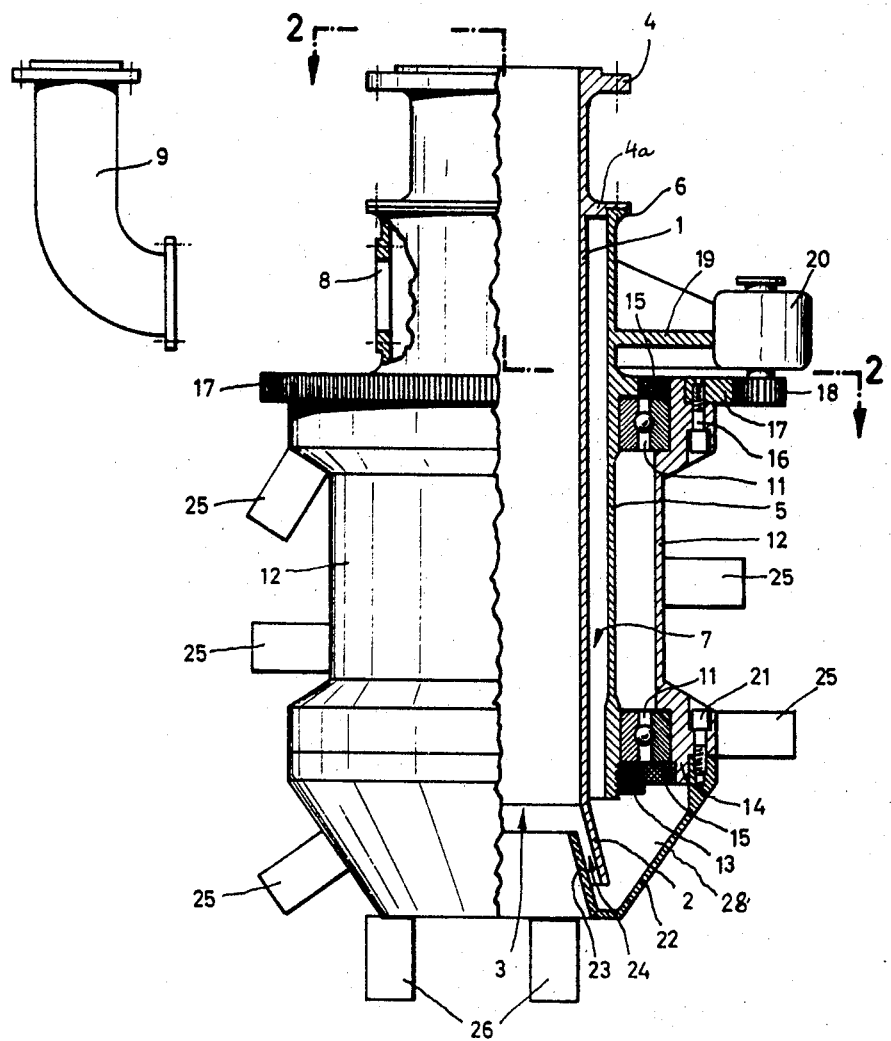
FIG. 1 is a partly elevational and partly vertical sectional view of a conveying apparatus which embodies my invention.
Figure 2:
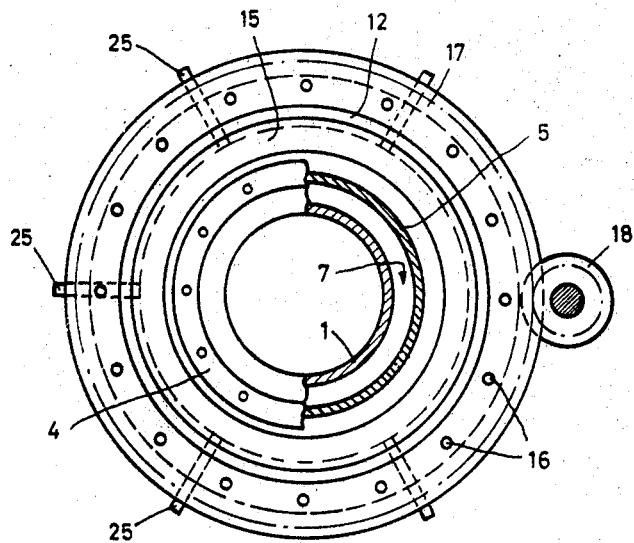
FIG. 2 is horizontal section as seen in the direction of arrows from the line 2—2 of FIG. 1.

The conveying apparatus of my invention comprises a suction head 1 having at its lower end an outwardly flaring funnel-shaped inlet 2 which defines an opening 3 for admission of sand or the like. The upper end of the suction head 1 is provided with a flange 4 which can be connected to an evacuating pipe (not shown) serving to transport sand above the surface of a body of water.

The impeller assembly which promotes the inflow of sand into the opening 3 of the inlet 2 comprises two units the first of which creates suction in the opening 3 and the second of which lossens the material around the suction head 1 and promotes penetration of the inlet 2 into a supply of sand at the bottom of a river, lake or another body of water. The first unit of the impeller assembly comprises a tubular pressure head 5 which is coaxial with and defines with the suction head 1 an annular channel or passage 7 for admission of compressed air or another pressure medium externally of the suction head and toward the inlet 2. The upper end 6 of the pressure head 5 is welded or otherwise secured to a flange 4a of the suction head 1. An opening 8 of the pressure head 5 just below its upper end 6 is connected with a supply conduit 9 which admits pressure medium into the passage 7. The lower end of the pressure head 5 can be connected to the suction head 1 by one or more distancing elements in the form of narrow ribs or the like (not shown).

The pressure head 5 is surrounded by two ball bearings 11 for a rotary tubular carrier 12 which is coaxial with the two heads 1 and 5 and forms part of the second flow promoting unit of the impeller assembly. The ball bearings 11 can be replaced by roller bearings, wire bearings or other suitable friction reducing means. A nut 13 meshes with the lower end of the pressure head 5 to hold the carrier 12 against axial movement. An annular sealing element 15 is preferably interposed between the lower end 14 of the carrier 12 and the nut 13 to prevent escape of pressure medium from the passage 7 into the interior of the carrier.

The drive means for rotating the carrier 12 comprises a prime mover 20 which is preferably constituted by an electric motor affixed to a bracket 19 of the pressure head 5 and a transmission including a gear 17 fixed to the upper end of the carrier 12 by screws 16 and a pinion 18 meshing with the gear 17 and affixed to the output shaft of the motor 20. A second annular sealing element 15 is interposed between the carrier 12 and pressure head 5 above the upper bearing 11.

The lower end 14 of the carrier 5 supports a nozzle 22 which is removably secured thereto by screws 21 or similar fasteners. This nozzle 22 forms part of both units in the impeller assembly in that it promotes the flow of sand into the opening 3 by deflecting the pressure medium from the passage 7 into the inlet 2 and by rotating with the carrier 5 to facilitate penetration of the apparatus into a supply of sand. The annular deflecting portion or skirt 23 of the nozzle 22 extends into the opening 3 and defines with the inlet 2 an annular orifice 24 which converges upwardly and admits into the suction head 1 an annular stream of pressure medium which reduces the pressure in the opening 3 and causes sand to penetrate into the suction head. Such material enters the annular stream of pressure medium and is entrained toward the upper end of the suction head 1 to enter the aforementioned evacuating pipe which is connected to the flange 4.

The apparatus further comprises a set of blades or vanes 25, 26 which preferably form one or more helices and are provided on the carrier 12 and/or on the nozzle 22. Such blades may consist of flat or spoon-shaped pieces of iron or other suitable metallic material. Helical distribution of blades 25, 26 promotes penetration of the nozzle 12 into a supply of sand and such blades loosen the sand to facilitate entry of loosened material into the opening 3 and into the stream of pressure medium issuing from the orifice 24 and flowing upwardly through the suction head 1.

The operation is as follows:

The apparatus is lowered into a body of water so that the nozzle 22 comes to rest on a supply of sand, gravel, silt or like comminuted material. The supply conduit 9 admits a gaseous or liquid pressure medium, preferably compressed air, which flows through the passage 7 and through the chamber 28 surrounding the inlet 2 to form an upwardly converging annular stream which issues from the orifice 24 and produces suction in the opening 3. The stream flowing between the annular deflecting portion or skirt 23 of the nozzle 22 and the internal surface of the inlet 2 resembles a hollow cone, and such stream continues to flow upwardly and to entrain sand above the surface of a body of water located on top of the sand layer. The sand which flows through the suction head 1 is mixed with water. When the pressure medium admitted by supply conduit 9 is air, its pressure may be in the range of 0.3–0.5 atmospheres above normal atmospheric pressure but such pressure can be higher.

The second unit of the impeller assembly insures that the nozzle 22 digs itself into the supply of sand and that the sand is loosened prior to entry into the suction head.

The motor 20 drives the blades 25, 26 through the intermediary of the carrier 12 and nozzle 22. The gear 17 can be driven at about five revolutions per minute. The helix or helices of blades 25, 26 penetrate into sand and insure gradual and uniform lowering of the nozzle 22 which insures that the suction head 1 receives a continuous stream of comminuted material.

It is clear that the improved apparatus can be used with equal advantage for conveying of sand, gravel, silt, earth or other comminuted flowable materials with or without a liquid carrier.

What is claimed as new and desired to be protected by Letters Patent is set forth in the appended claims:

1. Apparatus for raising by compressed air comminuted material particularly sand or the like from a supply of such material below a body of water, comprising a stationary suction head having a material-admitting inlet; a stationary tubular pressure head surrounding said suction head and defining an annular passage therewith having an open end adjacent said inlet; stationary conduit means communicating with said passage spaced from said inlet for feeding air under pressure into said passage; impeller means for promoting inflow of material into said suction head when said inlet is placed adjacent to a supply of material, said impeller means being turnably mounted on said pressure head below said conduit means and comprising blade means outwardly adjacent to said inlet and nozzle means substantially concentric with said inlet and communicating with said open end of said passage, said nozzle means having deflecting means for directing compressed air passing through said passage in a convergent annular stream into said suction head to produce in the latter a subatmospheric pressure to cause inflow of material into said inlet and entrainment by said stream; and drive means for rotating said impeller means and said blade means thereon so that said blade means penetrate into and loosen the supply of material which is thereupon drawn into said inlet.

2. Apparatus as defined in claim 1, wherein said impeller means comprises a tubular carrier coaxially surrounding said pressure head and supporting said blade means, said carrier being driven by said drive means.

3. Apparatus as defined in claim 2, wherein said pressure head comprises a tube coaxially surrounding said suction head, said carrier being coaxial with and surrounding said tube.

4. Apparatus as defined in claim 2, further comprising means for detachably securing said nozzle means to said carrier.

5. Apparatus as defined in claim 4, wherein said blade means comprises blades provided on said nozzle means and on said carrier.

6. Apparatus as defined in claim 2, wherein said drive means comprises a prime mover carried by said suction head, and transmission means connecting said prime mover with said carrier.

7. Apparatus as defined in claim 6, wherein said prime mover is an electric motor and said transmission means is a gear train.

8. Apparatus as defined in claim 1, wherein said blade means comprises a plurality of blades in helical distribution around the longitudinal axis of said suction head.

9. Apparatus as defined in claim 1, wherein at least a portion of said drive means is supported by said heads.

10. Apparatus as defined in claim 1, wherein said blade means comprises helically distributed blades provided on said nozzle means.

11. Apparatus as defined in claim 1, wherein said deflecting means defines with said inlet an annular orifice which flares outwardly and admits pressure medium from said passage into said suction head.

12. Apparatus as defined in claim 11, wherein said inlet flares outwardly.

(References on following page)

References Cited

UNITED STATES PATENTS

| | | | |
|---|---|---|---|
| 105,056 | 7/1870 | Eads | 37—61 |
| 365,140 | 6/1887 | Lynch | 37—67 |
| 558,118 | 4/1896 | Stevens | 37—67 |
| 869,273 | 10/1907 | Stoddard | 37—67 |
| 890,764 | 6/1908 | Geare | 37—64 |
| 1,530,654 | 3/1925 | Daley | 37—67 XR |
| 3,152,409 | 10/1964 | Ramsden et al. | 37—67 XR |

FOREIGN PATENTS

| | | |
|---|---|---|
| 1,310 | 4/1892 | Great Britain. |
| 766,412 | 4/1934 | France. |

ROBERT E. PULFREY, Primary Examiner

CLIFFORD D. CROWDER, Assistant Examiner

U.S. Cl. X.R.

37—64; 103—263; 302—15